Patented Feb. 15, 1944

2,341,735

UNITED STATES PATENT OFFICE 2,341,735

METHOD AND COMPOSITION FOR TREATING YARNS AND FABRICS

Boris Monsaroff, Hamilton, Ontario, Canada, assignor to Cosmos Imperial Mills Limited, Hamilton, Ontario, Canada No Drawing. Application July 31, 1942, Serial No. 453,133. In Canada July 13, 1942

5 Claims. (Cl. 117—161)

This invention relates to the treatment of yarn to render it heat, acid, and alkali resistant, and to a composition therefor.

The invention has particular utility in the treatment of yarn to be employed in the manufacture of drier felts for paper machines. As is well known, such felts are subject to conditions including heat and moisture in the presence of acids, alkalis or their salts and the like which, in combination with the friction exerted on the felts by the paper machine rolls, tend to hasten deterioration of the felt by both chemical and physical action.

The object of the present invention is to provide an improved composition for treatment of yarns whereby fabrics manufactured of yarn treated with such composition will be resistant to attack by heat, acids or alkalis while retaining all the normal desirable characteristics of the fabric. A further object is to provide a method of treating yarn with such a composition.

A composition for treating yarns or threads in accordance with the invention comprises a water soluble alkyd resin, preferably with the addition of a water soluble urea-formaldehyde resin.

While the production of various alkyd resins of the type insoluble in water but soluble in organic solvents has heretofore been proposed, it is believed that the production of a water soluble alkyd resin has not previously been suggested or accomplished.

The water soluble alkyd resin in accordance with the invention is prepared as follows:

Phthalic anhydride and glycerine are mixed in the proportion of one mole to two moles, respectively, and the mixture is heated to a temperature of approximately 150 to 160° C. whereby a reaction takes place. A resulting liquid resin is obtained which is well soluble in water at room temperature. An alternate mixture for production of the resin consists of equal molecular proportions of phthalic anhydride, glycerine and triethanolamine. The proportions of the reactants as well as the temperature range are important. It is known that a pure glycerol phthalate resin is formed by employing molecular proportions of phthalic anhydride and glycerine. The addition of another mole of glycerine or triethanolamine appears to hydrate the glycerol phthalate resin and give a water soluble product. If the water soluble alkyd resin is heated substantially above 160° C., it becomes insoluble in water. If it is heated above 200° C., it is cured completely and becomes insoluble in most inorganic solvents.

A bath for treatment of the yarn is now prepared as follows:

An aqueous solution of the water soluble alkyd resin, having a concentraton of solids of about 60%, is mixed with a water soluble urea-formaldehyde resin, the solid concentration of each resin being maintained substantially equal. The concentration of the final mixture depends upon the character of the fabric to be treated and the characteristics to be applied to the fabric and may vary from 5% to 50%. For the treatment of yarns for the production of drier felts, for instance, a concentration of 10%, or 5% of each type of resin, may advantageously be employed.

The bath may be alternatively prepared in the following manner: The alkyd resin is diluted to a desired concentration, and urea, formaldehyde and a catalyst, such as ammonia, are added to the solution in proportions calculated to produce, in situ, a portion of urea formaldehyde resin at least equal to the concentration of alkyd resin.

The yarn to be treated is placed in the bath at room temperature for impregnation by the solution.

The impregnated yarn is then cured at a temperature above 100° C. but not in excess of 200° C., which would be injurious to the yarn itself, and depending upon the speed desired for completion of the curing process. The yarn may be twisted wet before curing or it may be dried first and then twisted. These two alternative procedures will produce different shapes of thread with slightly varying characteristics as to tensile strength, but the two types of thread will not differ substantially in their heat and acid resistance properties.

The step of curing or drying of the yarn or thread may be accomplished quite rapidly, usually in about five minutes at 150° C., a film of combined urea-formaldehyde and adkyd resin being formed thereon. The resulting yarn or fabric made therefrom is highly resistant to refractory conditions and to the influence of acids and alkalis. In this connection, it should be noted that a very small percentage of solid material deposited upon the yarn is sufficient for the desired purpose. For instance, it has been found that as little as 6% of solids on the weight of yarn produces a yarn of very satisfactory resistant properties.

The properties of the combined resins which appear to contribute to the desired results may be set forth as follows: The urea formaldehyde resin is highly resistant to alkalis but is subject to decomposition by acids. The water soluble alkyd resin, prepared as described, is not affected by acids but is soluble to some extent in alkalis. The two resins applied as described combine to make the yarn resistant to both acids and alkalis.

It is apparent that various changes may be made in the steps described without departing from the spirit and scope of the invention.

A water soluble alkyd resin may be prepared by employing triethanolamine and phthalic anhydride in molecular proportions. A resin so prepared may be employed in the yarn treating process described although its curing characteristics are not as satisfactory as those of the resin previously mentioned.

While the bath described contains equal amounts of urea-formaldehyde resin and alkyd resin, this proportion may be varied to, say, 75% urea-formaldehyde to 25% alkyd, for certain purposes such as to reduce the curing time of the yarn. The urea formaldehyde resin is rapid curing while the alkyd is slow curing.

In some instances, where curing time or the use of high temperatures in excess of 200° C. are not injurious to the yarn during curing, a bath may be employed containing the water soluble alkyd resin alone.

While the treatment has been described as applied to the impregnation of yarn, it will be understood that such treatment may be applied to threads, cords or fabrics themselves.

I claim:

1. A method of treating textile cellulosic materials to render them heat, acid and alkali resistant which comprises forming a water soluble alkyd resin by reacting one mole of phthalic anhydride with substantially two moles of glycerine at a temperature of substantially 150–160° C., forming an aqueous solution containing substantially equal proportions of said resin and a water soluble urea formaldehyde resin, impregnating the material with the solution, and thereafter drying the material at substantially 150° to form a heat, acid and alkali resistant film of combined resins thereon.

2. A method of treating textile cellulosic materials to render them heat, acid and alkali resistant which comprises forming a water soluble alkyd resin by reacting one mole of phthalic anhydride with one mole of glycerine and one mole of triethanol amine at a temperature not substantially exceeding 160° C., forming an aqueous solution containing substantially equal proportions of said resin and a water soluble urea formaldehyde resin, impregnating the material with the solution, and thereafter drying the material at substantially 150° C. to form a heat, acid and alkali resistant film of combined resins thereon.

3. A method of producing an acid resistant coating composition which comprises forming a water soluble alkyd resin by reacting one mole of phthalic anhydride with substantially two moles of glycerine at a temperature not exceeding substantially 160° C.

4. A method of producing an acid resistant coating composition which comprises forming a water soluble alkyd resin by reacting one mole of phthalic anhydride, one mole of glycerine and one mole of triethanol amine at a temperature not exceeding substantially 160° C.

5. A composition for impregnating cellulosic materials to render them heat, acid and alkali resistant comprising an aqueous solution of substantially equal proportions of an alkyd resin and a urea formaldehyde resin, said akyd resin being formed by reacting one mole of phthalic anhydride with substantially two moles of glycerine at a temperature not exceeding substantially 160° C.

BORIS MONSAROFF.